Dec. 11, 1956    T. R. PERZENTKA ET AL    2,773,418
PHOTOGRAPHIC COPYING AND VIEWING APPARATUS
Filed Jan. 26, 1955    9 Sheets-Sheet 1

Inventors:
Thomas R. Perzentha
Stuart C. Plettner
By Robert F. Miehle, Atty.

Dec. 11, 1956  T. R. PERZENTKA ET AL  2,773,418
PHOTOGRAPHIC COPYING AND VIEWING APPARATUS
Filed Jan. 26, 1955  9 Sheets-Sheet 3

Inventors:
Thomas R. Perzentka
Stuart C. Plettner
By Robert H. Mehle, Atty.

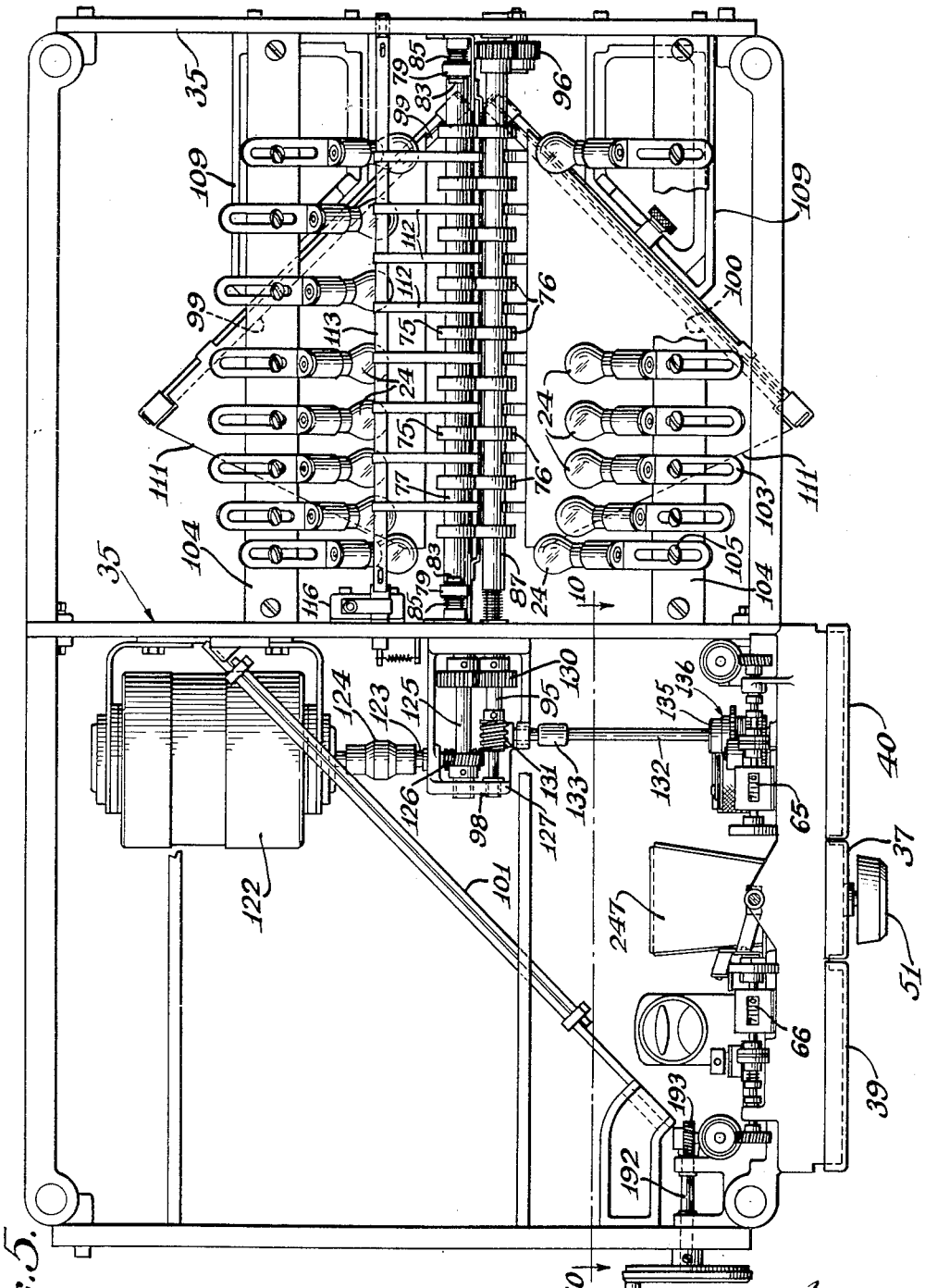

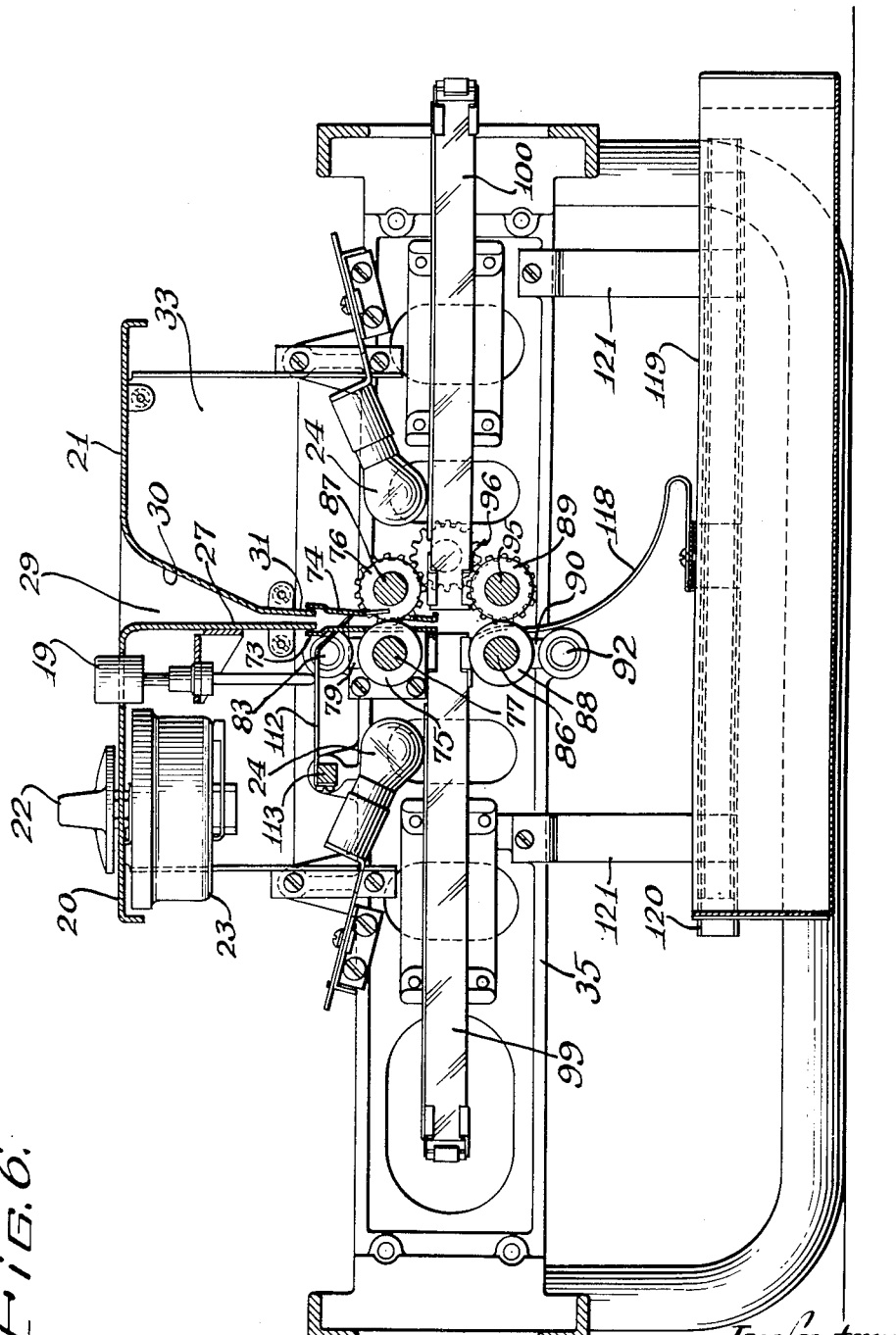

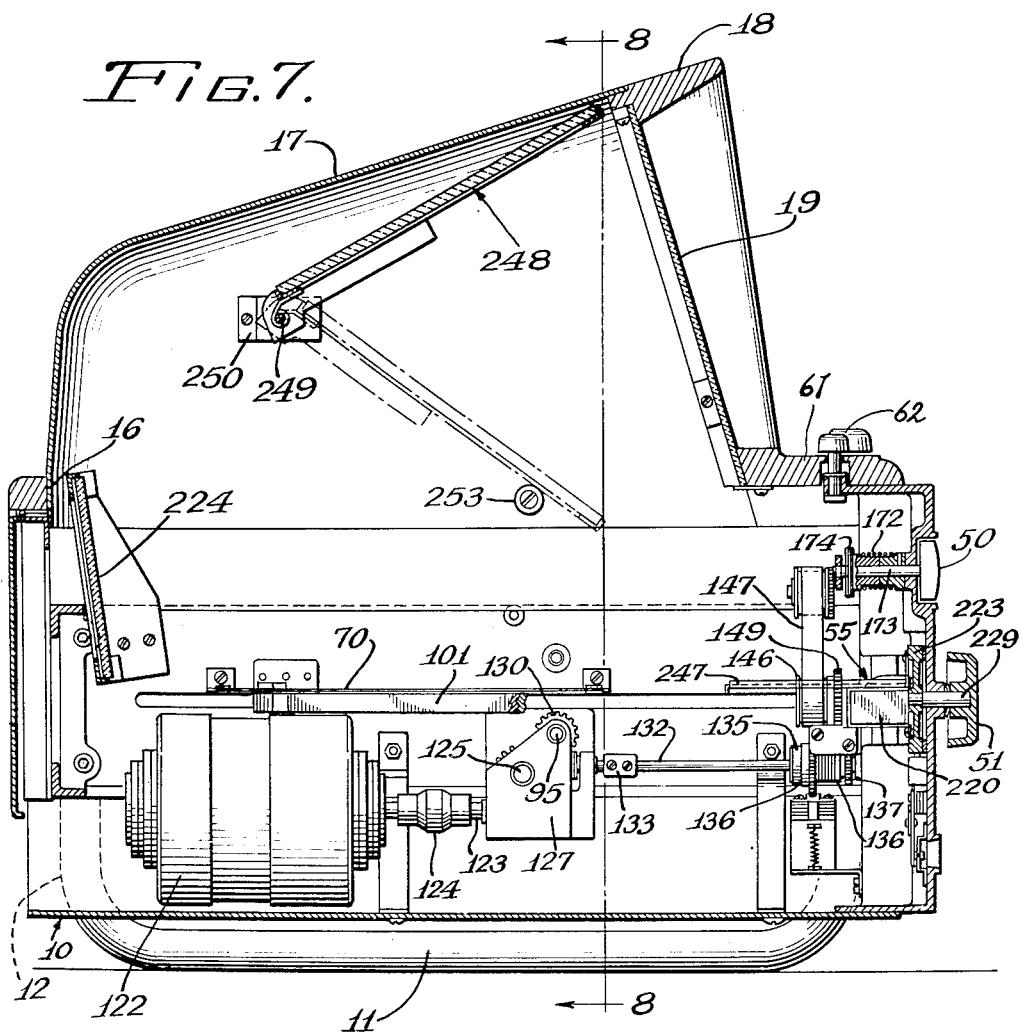

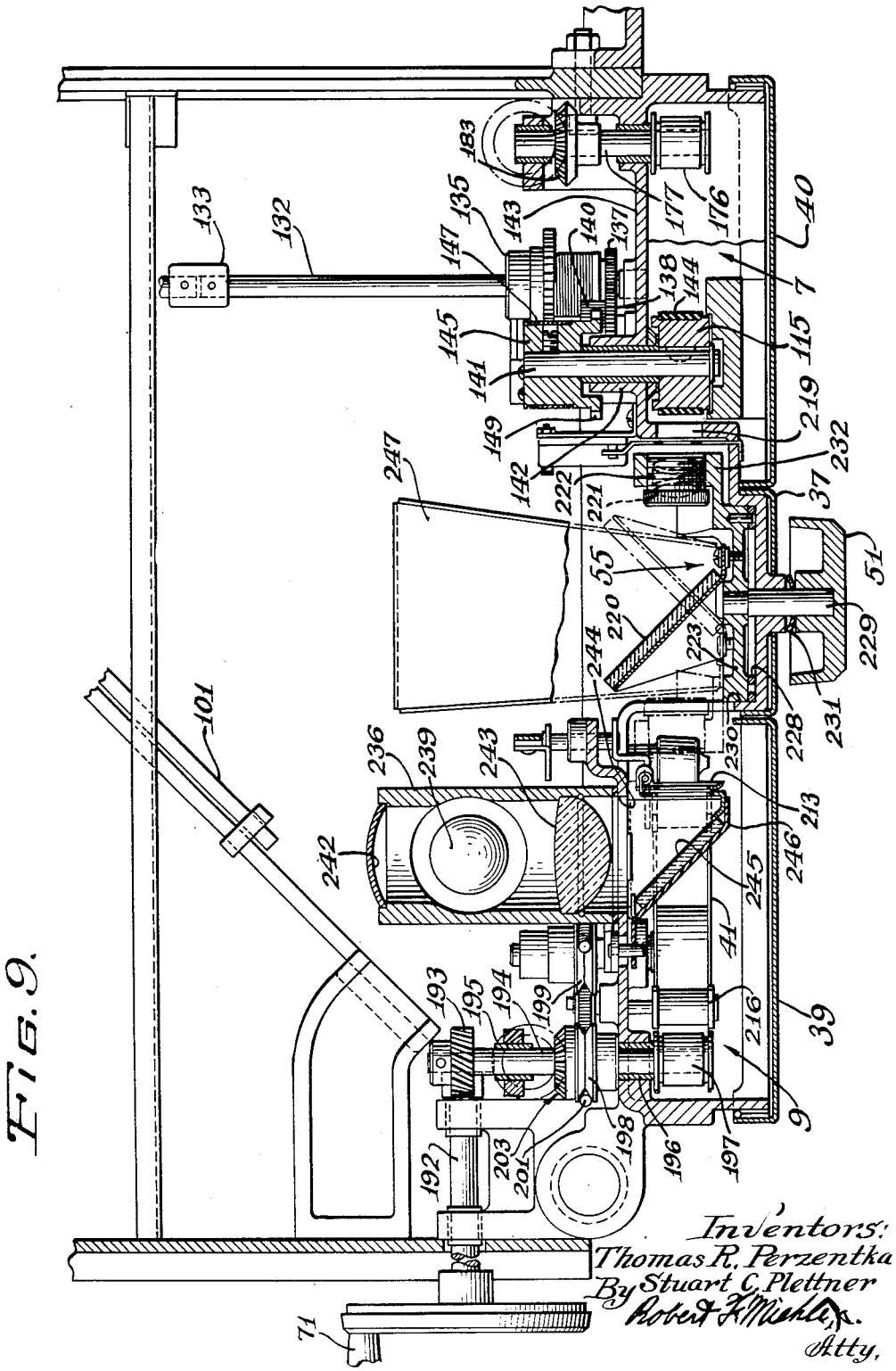

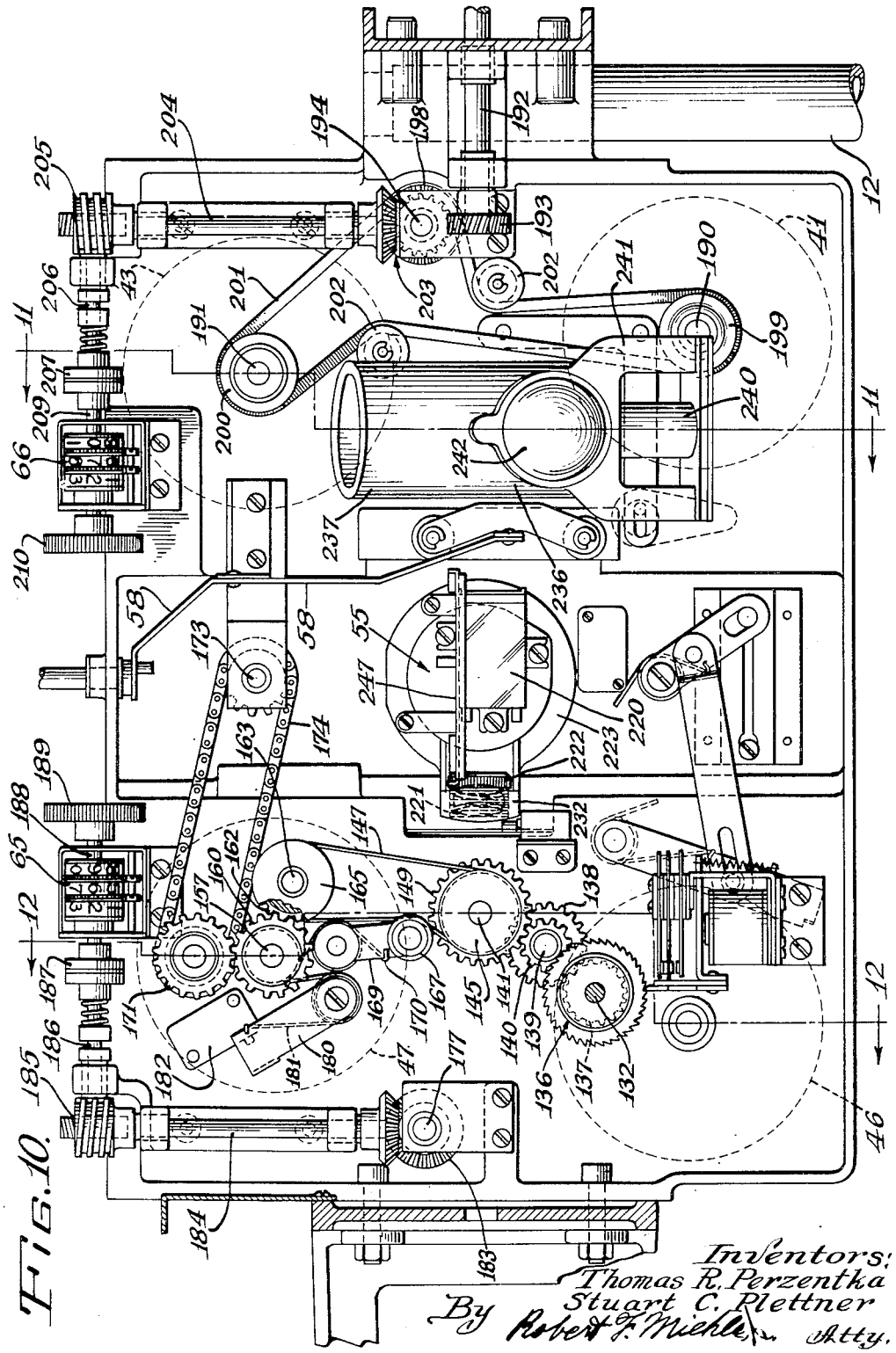

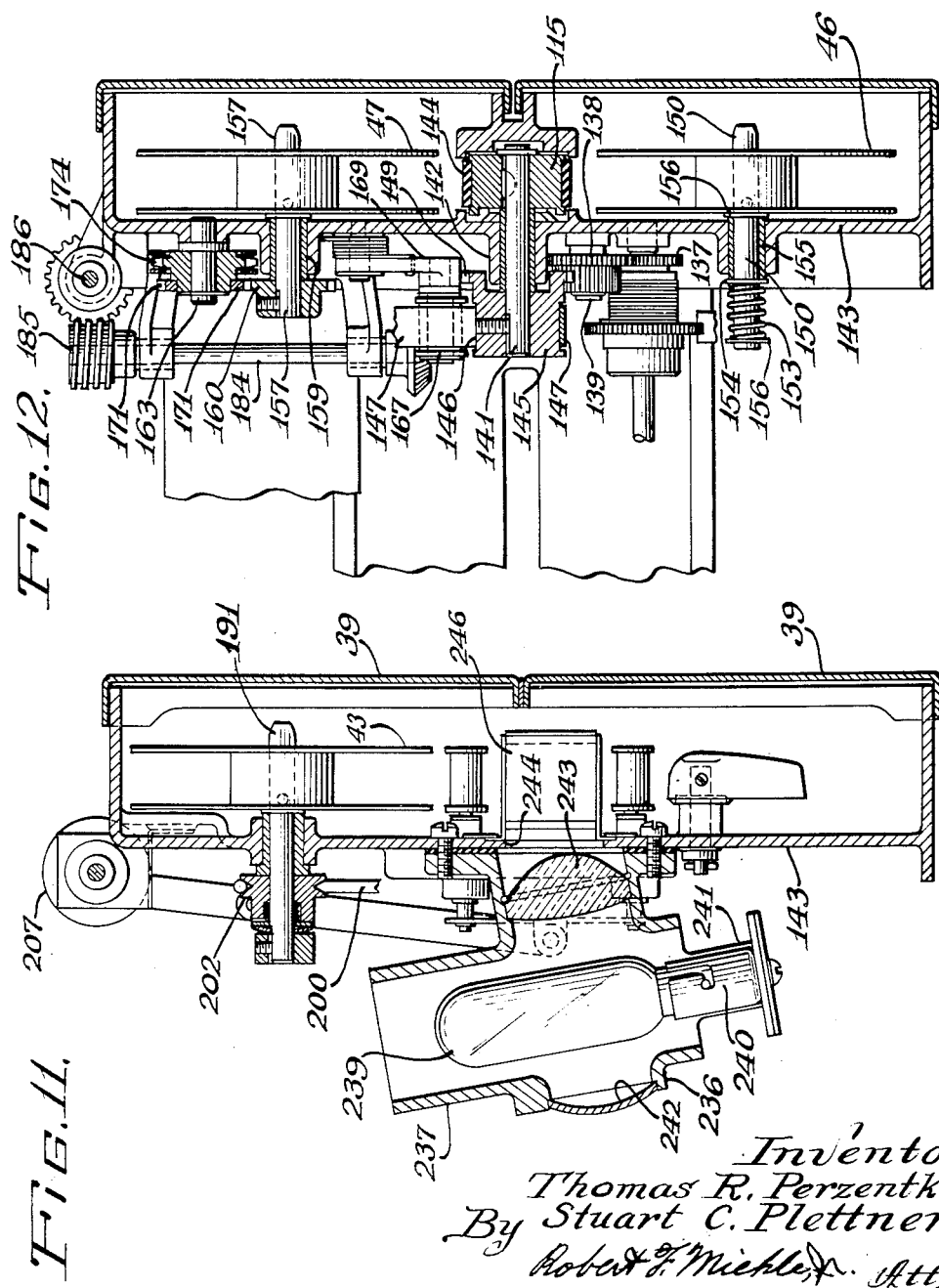

United States Patent Office 2,773,418
Patented Dec. 11, 1956

2,773,418

PHOTOGRAPHIC COPYING AND VIEWING APPARATUS

Thomas R. Perzentka, Niles, and Stuart C. Plettner, Evanston, Ill., assignors to Bell & Howell Company, Chicago, Ill., a corporation of Illinois Application January 26, 1955, Serial No. 484,291

6 Claims. (Cl. 88—24)

This invention relates to a combined copying and viewing apparatus for making photographic records on a sensitized film strip and for reading records on a record bearing strip.

A principal object of our invention is to provide a simple, novel, compact and efficient combined copying and viewing apparatus for photographing a record from copy onto a sensitized film strip and for reading and making enlarged copies of records on a record bearing strip.

Another object of our invention is to provide a novel copying and reading apparatus in which a common optical means is operable to alternately cooperate with photographic copying and projection stations.

Still another object of the invention is to provide a combined photographic copying and reading apparatus in which the exposure and projection stations are arranged on opposite sides of a common reflector and converging lens, positionable to alternately cooperate with the exposure and projection stations as desired.

A further object of the invention is to provide a combined copying and viewing apparatus in which a horizontal diagonal reflector, reflects a beam of light disposed to one side thereof onto a common optical means for co-operation with an exposure station for copying a record bearing strip, and in which the optical means is selectively positionable for projecting an image from a record bearing strip for reading and is so arranged as to project a beam of light out of the path of the diagonal reflector, when the common optical means is in a reading position.

Another object of the invention is to provide an efficient and compact arrangement of copying and viewing apparatus having a unitary casing for the apparatus, a feed throat for copy leading downwardly through the top thereof on one side of the apparatus, and a reading screen and hood extending above the top thereof on the other side of the apparatus, wherein feed and illuminating and reflecting means for copying are disposed beneath the top at said first mentioned side of the apparatus in cooperative relation with the feed throat, and spaced projection and exposure stations together with a common optical means for reading and copying disposed therebetween are disposed beneath the reading screen at the other side of the apparatus.

Another object of the invention is to provide a convenient and desirable indexing arrangement whereby desired material on a record bearing strip may be conveniently and quickly located for viewing.

These and other objects of our invention will appear from time to time as the following specification proceeds and with reference to the accompanying drawings wherein:

Figure 5 is an enlarged plan view with certain parts removed and certain other parts shown in section and looking substantially along line 5—5 of Figure 4;

Figure 6 is an enlarged sectional view taken substantially along line 6—6 of Figure 4 and showing certain details of the copy feed and reflecting part of the apparatus;

Figure 7 is a sectional view taken substantially along line 7—7 of Figure 4, drawn to substantially the same scale as Figure 4 and showing certain details of the viewing part of the apparatus;

Figure 9 is an enlarged fragmentary horizontal sectional view taken substantially along line 9—9 of Figure 4 in order to show certain details of the projector for viewing and the camera for copying and the common optical means for viewing and copying;

Figure 10 is a forwardly directed sectional view taken substantially along line 10—10 of Figure 5 and showing certain details of the projector and camera and common optical means not shown in Figure 9;

Figure 11 is a sectional view taken substantially along line 11—11 of Figure 10 and showing certain details of the projector for viewing; and Figure 12 is a sectional view taken substantially along line 12—12 of Figure 10 and showing certain details of the camera for copying.

Figure 1:
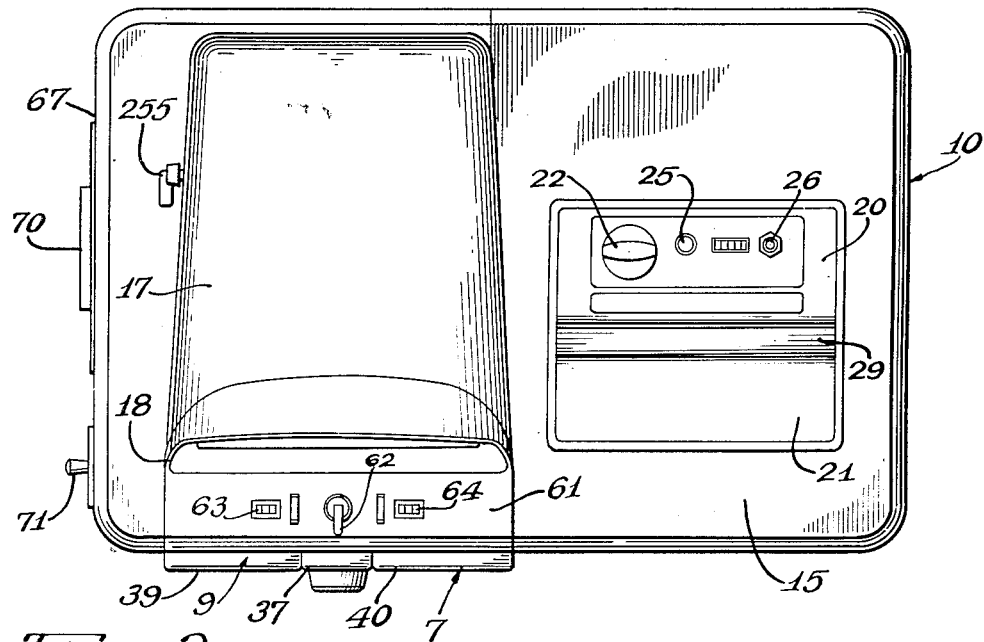
Figure 1 is a plan view of a combined copying and viewing apparatus constructed in accordance with our invention.
Figure 2:
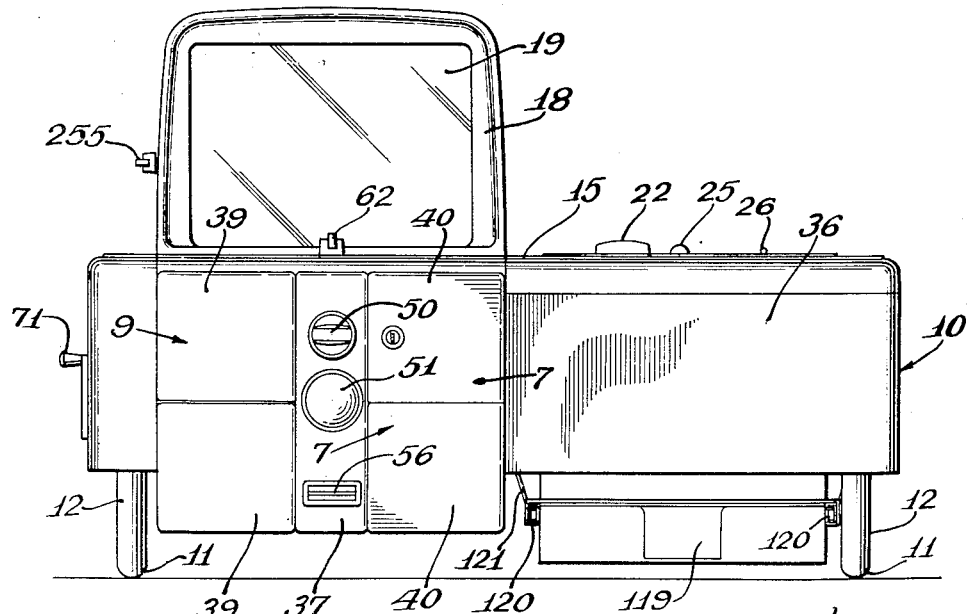
Figure 2 is a front elevation of the combined copying and viewing apparatus shown in Figure 1.

In the embodiment of our invention illustrated in the drawings, we have shown generally in Figures 1, 2, 3 and 4, a photographic copying and viewing apparatus including a camera 7 and a projector 9 contained within one side portion of a casing 10 and a copy feed and illuminating means 13 contained within the other side portion of the casing. The casing 10 is shown as being carried on rails 11 which may be engageable with the top of a table or like support and have upright legs 12 formed integrally therewith, supporting the casing 10 in vertically spaced relation with respect to its support.

Figure 3:
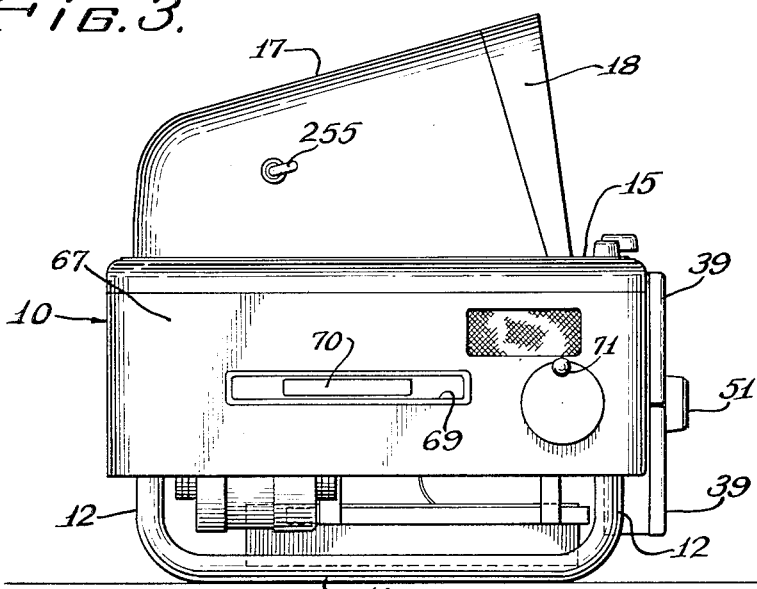
Figure 3 is an end elevation of the apparatus looking toward the viewing end thereof.
Figure 8:
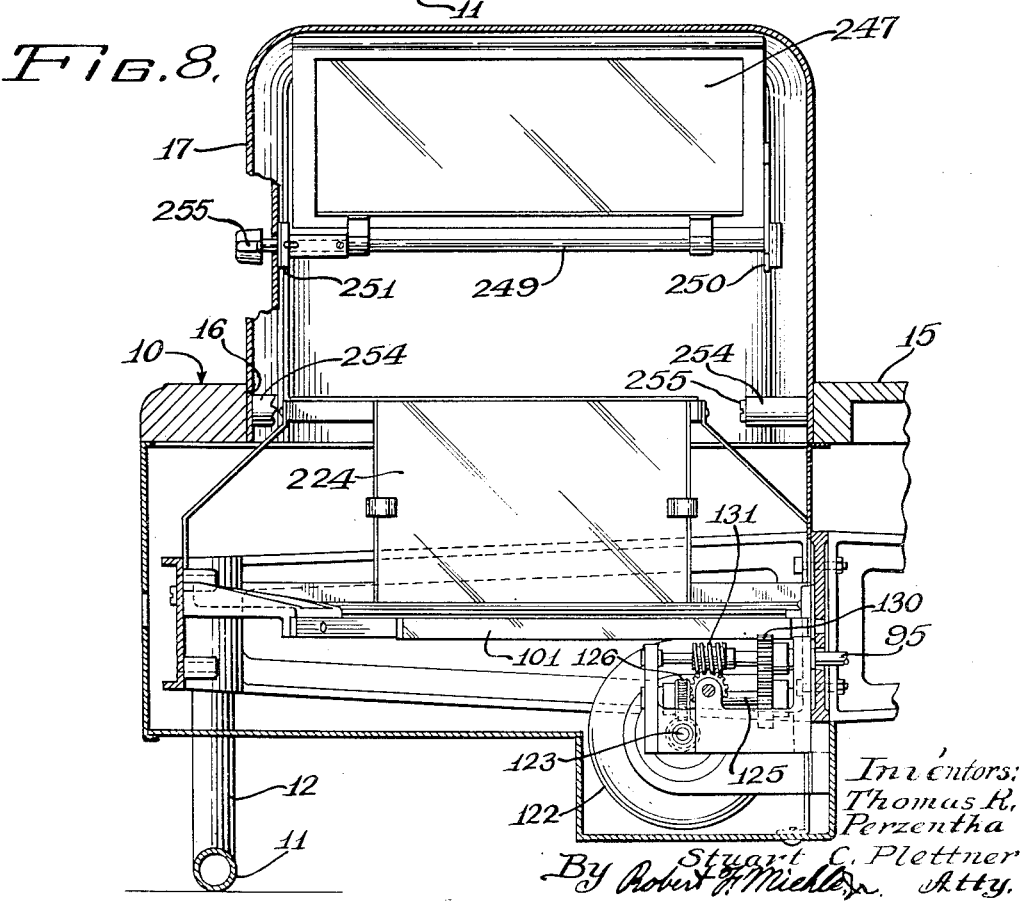
Figure 8 is a fragmentary sectional view taken substantially along line 8—8 of Figure 7.

The casing 10 is shown in Figures 1, 3 and 8 as having a generally flat top 15 open to one side above the camera 7 and projector 9 as indicated generally by reference character 16. The open portion 16 is provided to receive a hood 17 mounted in said open portion and projecting above the top 15. A frame 18 for a forwardly directed translucent viewing screen 19, extends about the forward end of the hood 17. The reading or viewing screen 19 is directed at a receding angle with respect to the front of said casing for convenience in viewing.

The top 15 of the casing 10 to one side of the viewing screen 19 also has an open portion therein for receiving spaced plates 20 and 21. See Figures 1 and 6. The plate 20 is shown as having certain controls for the apparatus on the upper side thereof, such as a knob 22 for operating a resistance 23 suitably carried beneath said plate, and operable to control the brightness of a series of incandescent lamps 24, disposed beneath the plates 20 and 21 for illuminating the copy. The plate 20 also has an indicator lamp 25 and a main switch 26 suitably mounted thereon.

The end of the plate 20 adjacent the plate 21 is shown as being turned downwardly at right angles with respect thereto, to form a vertical side wall 27 of a feed throat 29 for copy. The plate 21 is shown as having a downwardly sloping wall portion 30, sloping downwardly toward the wall 21 and terminating into a generally vertically disposed wall 31 at its lower end, to form the opposite side wall of the feed throat 29. The plates 20 and 21 are shown as being secured at their ends to parallel spaced end plates 33, carried within the casing on bracket members 34 sloping upwardly from opposite side frame members 35 of the copy feed and illuminating section 13 (see Figures 4 and 6).

The portion of the casing 10 in front of the copy feed and illuminating section 13 is shown as having a plain front wall 36, while the front portion of the casing 10 beneath the viewing screen 19 is shown as having a central control panel 37 having removable end plates or covers 39, 39 and 40, 40 to each side thereof and affording access to the projector 9 and camera 7 respectively. The covers 39, 39 enclose reels 41 and 43 of the projector for a record bearing strip 45, which serve as feed and take up reels therefor depending upon the direction of rotation thereof. The covers 40, 40 afford access to feed and take up reels 46 and 47 respectively and an exposure drum 115 of the camera for a sensitized film strip 49.

The central control panel 37 has a knob 50 rotatably carried thereon, adjacent the upper end thereof, for winding the film by hand, as will hereinafter be more fully described as this specification proceeds.

The control panel 37 also has a knob 51 thereon for controlling a common optical means 55 for the camera 7 and projector 9 and operable to selectively position said optical means to effect the projection of an image from illuminated copy to the exposure field of the camera for photographically copying the same, or to project images from the record bearing strip 45 in the projector for viewing the same on the viewing screen 19 or printing enlarged images thereof.

Beneath the knob 51 is a film supply indicator generally indicated by reference character 56, for indicating the film supply on the feed reel 46 of the camera through the operation of a pivoted lever 57. The lever 57 has a roller 59 on the free end thereof which is biased into engagement with the film by a torsion spring 60 to indicate the film supply on the feed reel 46 as is a well known manner to the art, so need not herein be shown or described further.

The top 15 of the casing 10 in front of the viewing screen 19 also has a panel 61 thereon for a shifting lever 62, operable to operate a pivoted shifter 58 to shift the record bearing strip 45 laterally for projection in a conventional manner so not herein described further. The panel 61 also has openings 63 and 64 therein on opposite sides of the lever 62, which may be closed by glass, and which form a means for viewing adjacent resettable indexing counters 65 and 66, of usual construction, see Figures 5 and 10, for the sensitized film strip 46 in the camera and the record bearing strip 46 in the projector, respectively, as will hereinafter be more fully described.

The end of the casing 10 adjacent the hood 17 and viewing screen 19 is shown as having a side wall 67 having a slot 69 therein for a sliding easel 70 which is used for printing purposes. The side wall 67 also has a reader crank 71 on the outside and adjacent the forward end thereof, for operating the reels 41 and 43 of the projector 9, when it is desired to read a record or image on the record bearing strip 45.

Figure 4:
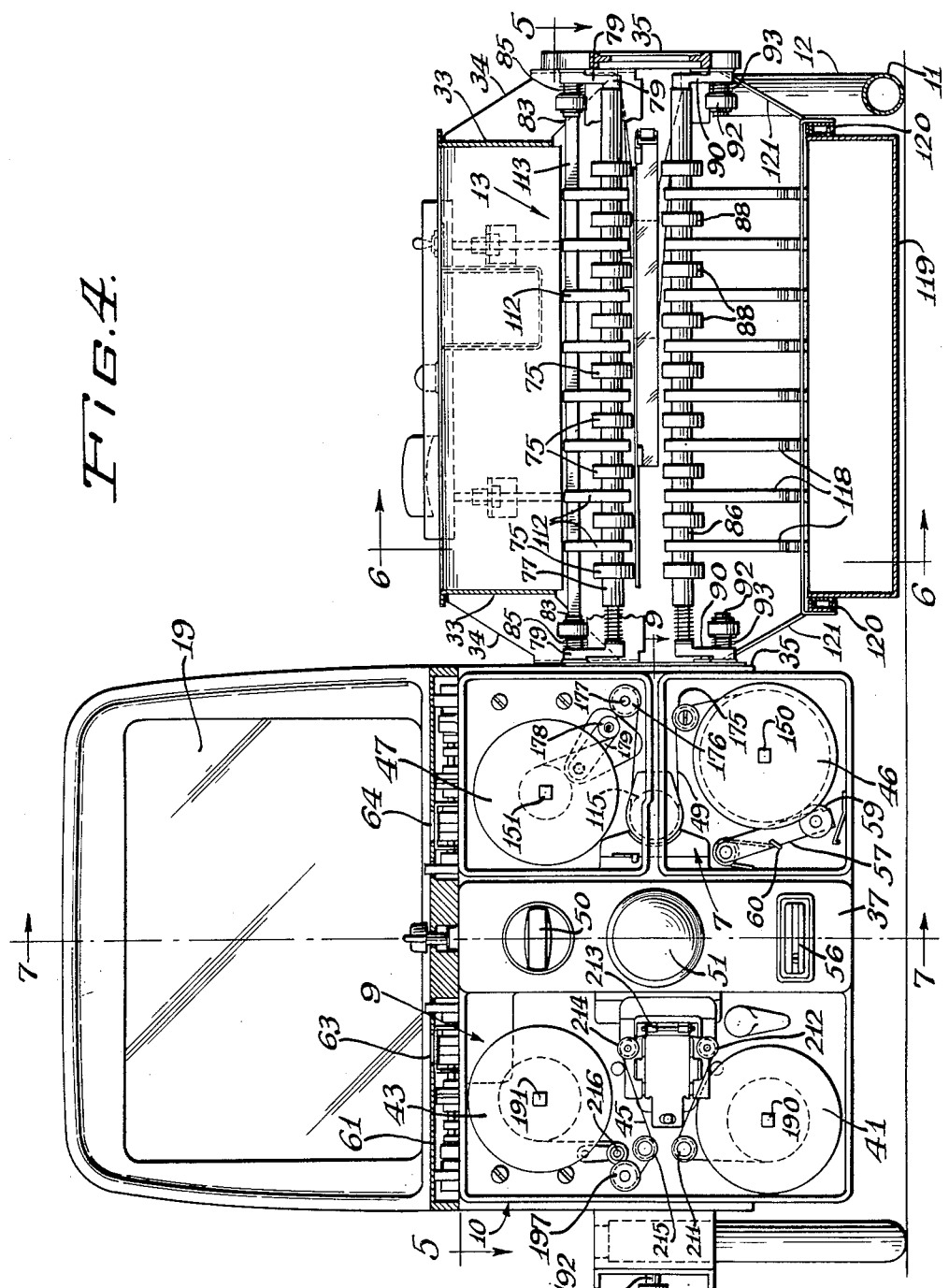
Figure 4 is an enlarged front elevation of the apparatus somewhat similar to Figure 2, but showing certain parts removed and certain other parts in section.

Referring now to the copy feed and illuminating section 13 and Figures 4, 5 and 6 in particular, the feed throat 29 is shown as being lapped at its discharged end by two spaced guide plates 73 and 74 extending downwardly therefrom along opposite sides thereof and guiding the copy to opposing feed rolls 75 and 76 extending through suitable apertured portions of said plates into the space therebetween. The rolls 75 are carried on a shaft 77 journalled at its ends in crank arms 79 mounted in the end frame members 35 on shafts 83 extending inwardly of said end frame members. Torsion springs 85 on the shafts 83 are provided to bias the cranks 79 in a direction to press the rolls 75 into engagement with the rolls 76. The rolls 76 are shown as being carried on a driven shaft 87 journalled at its ends in the end frame members 35.

Spaced beneath the feed rolls 75 and 76 and in vertical alignment therewith are a second set of opposing feed rolls 88 and 89 for pulling the copy from the feed rolls 75 and 76 and maintaining tension thereon. The rolls 88 are shown as being carried on a shaft 86 journalled at its ends in crank arms 90 pivoted to the end frame members 35 on shafts 92 and biased into engagement with the feed rolls 89 by torsion springs 93. The feed rolls 89 are carried on a driven shaft 95 suitably journalled in the end frame members 35. The shafts 87 and 95 are connected together to be driven at the same speeds through a gear train indicated generally by reference character 96 (see Figures 5 and 6).

In the space between the feed rolls 75, 76 and 88, 89 are two angular disposed reflectors 99 and 100 diverging outwardly from the copy from a point adjacent the outer side frame 35 and facing the projection and viewing section of the casing 10, for reflecting images from both sides of the copy onto an angularly disposed horizontally extending reflector 101 beneath the viewing screen 19 and in horizontal alignment with reflectors 99 and 100 for reflecting these images from the reflectors 99 and 100 to the optical means 55, for photographic copying.

The lamps 24 are shown as being adjustably supported on longitudinally extending bars 104 arranged on opposite sides of the feed rollers 75 and 76 immediately above the reflectors 99 and 100.

The reflectors 99 and 100 are mounted on bracket members 109, extending inwardly from the outer end frame member 35 on opposite sides of the path of travel of the copy between the respective feed rolls 75 and 76 and 88 and 89.

The oblique reflectors 99 and 100 are shown as being shielded from the direct rays of the lamps 24 by means of shields 111 secured to the support members 107 and extending inwardly therefrom beneath the lamps 24 and just above the reflectors 99 and 100 and stopping short of the feed rolls 75 and 76 a distance sufficient to adequately illuminate the copy.

A plurality of feeler arms 112 are shown as being mounted on a switch bar 113, pivotally mounted at its ends in the frame members 35, parallel to, but spaced rearwardly from the feed rolls 75 and 76. The feeler arms 112 extend through suitable apertured portions of the plate 73, and the switch bar 113 is spring biased counterclockwise in Figure 6, so that normally the feeler arms extend across the space between the plates 73 and 74, and when the copy passes downwardly between these plates it actuates the feelers downwardly and correspondingly turns the switch bar 113, the feelers and switch bar being returned to normal position by reason of the spring bias on the switch bar after the copy passes the feelers. The switch bar 113 has a conventional operative connection with a switch generally indicated at 116 in Figure 5, for controlling the copying operation as hereinafter described.

Spaced guide fingers 118 extend downwardly from the rolls 88, 89 and are curved forwardly to guide the photographed copy onto a tray or drawer 119 slidably carried in spaced slides 120 suspended from the side frame members 35 on hangers 121.

A drive motor 122 for driving the shafts 87 and 95 together with the feed rolls 76 and 89, and the exposure drum 115 and take up reel 47 of the camera, drives an axially aligned shaft 123 through a coupling 124 (see Figure 5). The shaft 123 drives a horizontal shaft 125 perpendicular to the shaft 123 through worm gearing 126. The shafts 123 and 125 are journalled in a box like bracket 127, secured to the inner side frame member 35 on the opposite side thereof from the feed rolls 75, 76, 88 and 89, and the shaft 125 drives the shaft 95 through a gear train 130.

The shaft 95 drives a drive shaft 132 for the exposure drum 115 and take up reel 47 through worm gearing 131 and a coupling 133. The shaft 132 in turn drives a drive member 135 of a solenoid controlled releasable clutch 136 of suitable construction unnecessary to be described in detail herein.

The releasable clutch 136 serves to drive a coaxial gear 137, meshing with a gear 138 on a strut shaft 139. See Figure 10. A gear 140 is mounted on the strut shaft 139 and is driven from the gear 138 and meshes with and drives a gear 149 on the inner side of a flat pulley 145 secured to a drive shaft 141 on which the exposure drum 115 is secured. The shaft 141 is journalled in a boss 142 extending inwardly from an end wall 143 of the casing of the camera 7 and projector 9. The exposure drum 115 has a resilient face 144 for engaging the sensitized film strip and driving the same.

The feed reel 46 is shown in Figures 4 and 12 as being detachably mounted on the squared end of a shaft 150 journalled in the wall 143. A compression spring 153 on the shaft 150 is interposed between a collar 154, abutting the end of a bearing 155 for the shaft 150, and a collar 156 fixed on the inner end of the shaft.

The take up reel 47 is detachably mounted on the squared end of a shaft 157 to effect rotation of said take up reel with said shaft. The shaft 157 is journalled in a bearing 159, carried in the wall 143. The shaft 157 projects inwardly from the wall 143 and bearing 159 and has a gear 160 secured to its inner end. The gear 160 meshes with and is driven from a spur gear 162 on a shaft 163 (see Figure 10). The shaft 163 is driven from a pulley 165, driven by a belt 147 trained about and driven from the pulley 145 on the drive shaft 141. A take up idler 167 on the end of a pivoted arm 169 is provided to take up tension on the belt 147 and is biased into engagement therewith as by a torsion spring 170. This belt drive provides the usual yielding drive for the take up reel shaft 157 of the camera.

The gear 160 also meshes with a gear 171 disposed thereabove and driven from the hand film wind knob 50, through a one way clutch 172 on a shaft 173 operated by the knob 50, and a chain and sprocket drive 174 driven by said clutch (see Figures 7, 10 and 12). By means of the knob 50 and its drive connection with the take up reel spindle 157, the take up reel may be manually rotated in the direction to take up the film strip 49 in the camera to take up the leading and trailing end of the strip and to provide space between groups of images photographed on the strip, the one way clutch 172 preventing rotation of the take up reel in the reverse direction so that the strip cannot be unwound from the take up reel.

The sensitized film strip 49 is shown in Figure 4 as being trained from the feed reel 46 upwardly about a roller 175 on the opposite side of the shaft 150 from the exposure drum 115 and inwardly from said idler toward and about the exposure drum 115. The film strip 49 is then trained in an opposite direction about a roller 176 on a shaft 177 journalled in the wall 143 and extending therethrough for driving the counter 65, as will hereinafter more clearly appear as this specification proceeds.

From the roller 176 the film is trained about a tension roller 178 to the take up reel 47. The tension roller 178 is shown as being mounted on a pivoted arm 179 on the inside of the wall 143 and as being biased against the film strip by an arm 180, see Figure 10, on the outside of the wall 143 and fixed with the arm 179 for pivotal movement therewith and a torsion spring 181 operative on the arm 180. A microswitch 182 is actuated by the arm 180 under the influence of the spring 181 when the roller 178 is not held in normal position by the film strip for indicating when the film strip in the camera is fully exposed and wound on the take up reel.

The drive from the sensitized film strip 49 to the indexing counter 65, for indexing what has been recorded, is through the roller 176 driven by the film strip 49 and the shaft 177 carrying said roller (see Figures 9 and 10). Bevel gears 183 serve to drive a vertical shaft 184 from the shaft 177. The vertical shaft 184 in turn drives a worm and worm gear drive 185 from its upper end, which drives a horizontal shaft 186, extending parallel to the wall 143 beneath the panel 61, extending along the front of the viewing screen 19. A yieldable coupling 187 is connected to drive an aligned shaft 188 from the shaft 186 and the shaft 188 comprises the drive shaft of the counter. A knurled wheel 189 on the inner end of the counter drive shaft 188 is provided to set the counter 65 by hand, as is usual.

The reels 41 and 43 for the projector, are shown as being removably carried on vertically spaced driven shafts 190 and 191 respectively, journalled in the wall 143 and projecting inwardly therefrom and having the usual squared outer end portions on which the respective reels 41 and 43 are detachably carried. The shafts 190 and 191 are driven from the hand crank 71 through a shaft 192 carrying said hand crank and extending therefrom within the casing 10, and rotatably driven by said hand crank. Helical gearing 193 driven from the inner end of the shaft 192 drives a shaft 194, journalled intermediate its ends, within the casing 10 in a bearing bracket 195, and extending outwardly through the casing wall 143, and journalled therein on a bearing 196. A drive roller 197 having a recessed flat drive face is suitably secured to the outer end of the drive shaft 194 on the outside of the wall 143 and has the record bearing strip 45 partially wrapped thereabout for driving the same.

The shaft 194 has a pulley 198 secured thereto inwardly of the wall 143, and pulleys 199 and 200 are respectively rotatably mounted on the reel shafts 190 and 191, and a belt 201 is trained about these pulleys and idler pulleys 202 for driving the pulleys 199 and 200 with manual rotation of the crank 71. The pulleys 199 and 200 are respectively connected to the reel shafts by usual one way clutches, not shown, arranged to alternately drive the reel shafts with reversal of rotation of the crank 71 for feeding the film strip between the reels 41 and 43 in either direction.

The drive from the record bearing film strip 45 in the projector to the indexing counter 66 is similar to that from the sensitized film strip 49 in the camera to the indexing counter 65 and briefly comprises bevel gearing 203 driving a vertical shaft 204 from the shaft 195, worm gearing 205 driving a horizontal shaft 206, extending parallel to the wall 143 beneath the panel 61, from the shaft 204, and yieldable coupling 207 driving the drive shaft 209 of this counter from the shaft 206. A knurled wheel 210 on the inner end of the counter drive shaft 209 is provided to set the counter by hand, as is usual.

The record bearing strip 45 in the projector is shown in Figure 4 as being trained from the lower reel 41 upwardly to and around a roller 211 on the opposite side of the axis of said reel from the projection apertured film gate 213 of the projector, and inwardly from said roller 211 in a downwardly inclined direction to a roller 212. From thence the record bearing strip is trained upwardly through the film gate 213, to and around a roller 214, spaced vertically from the roller 212 and rotating about an axis parallel to and in vertical alignment with the axis of rotation of the roller 212. The record bearing strip then extends angularly downwardly to and around a roller 215 and upwardly therefrom around the drive pulley 197. The record bearing strip 45 is wrapped partially around the drive pulley 197 by a roller 216 spring biased toward this pulley, and extends upwardly therefrom to and around the upper reel 43.

Noting that the projector 9 and camera 7 are disposed on opposite sides of the central control panel 37, see Figures 4 and 9, the exposure aperture 219 of the camera forming the exposure station thereof and the projection apertured film gate 213 of the projector forming the projection station thereof, are horizontally spaced on opposite sides of the panel 37.

The common optical means 55, for copying and viewing, is arranged between these exposure and projection stations and comprises a reflector 220 and a converging lens 221, serving both as a camera and a projection lens, in a lens carrier 222 which are carried on a turret 223 which is mounted on the panel 37 for rotation on horizontal axis between the exposure and projection stations of the camera and projector and toward which these stations are directed. The lens 221 is arranged radially of the turret axis and the reflector 220 is inclined to the turret axis and is directed toward the lens 221 and rearwardly toward the reflector 101 and another reflector 224 (see Figures 7 and 8) arranged above the reflector 101 and inclined upwardly and rearwardly for reflecting an image from the reflector 220 onto the viewing screen 19 for viewing as hereinafter more fully described.

The turret 223, see Figure 9, is partially recessed within a recessed portion 230 of the wall 143 and is carried on the inner end of a shaft 229 rotatably mounted in the wall 143. The knob 51 is secured to the outer end of the shaft 229 for rotating said shaft and turret as desired. The turret 223 has an annular friction member 228 secured thereto and engaging an inner side of the wall 143 in the recessed portion 230 for said turret. A spring washer 231 is carried on the shaft 229, and is interposed between the inner side of the knob 51 and the outer side of the wall 143 to exert sufficient friction between the friction surface of the friction member 228 and the wall portion 143 within the recessed portion 230, to hold the turret 223, the lens 221, and reflector 220 in adjusted position.

The lens carrier 222 is shown as being threaded within a lens mounting 232 spaced outwardly from the periphery of the turret 223 and formed integrally therewith.

When the turret 223 is angularly positioned as shown in full lines Figures 9 and 10, the reflector 220 and lens 221 are directed toward the exposure aperture 219 of the camera, copy, as it is fed downwardly by and between the feed rollers 75, 76, 88 and 89 (see Figure 6) may be photographed on the sensitized film in the camera 7, the images of both sides of the copy being respectively reflected in side by side relation by the reflectors 99 and 100 onto the reflector 101, the reflector 101 reflecting both images onto the reflector 220, and the reflector 220 reflecting both images through the lens 221 onto the film 49 at the exposure aperture 219 of the camera.

The drive motor 90 is energized and runs constantly when the machine is in condition for copying and the feed rollers 76 and 89 are constantly driven by the motor, and while copy is not being fed downwardly through the throat 29 and between the feed rollers 75, 76, 88 and 89, the clutch 136 is disengaged so that the exposure drum 115 and take up reel 47 of the camera are stationary and the film 49 in the camera is consequently not driven, and the lamps 24 are not illuminated.

The clutch 136 and the energization of the lamps 24 are under the control of the switch 116 through suitable circuitry unnecessary to be described, so that as each sheet of copy is fed downwardly through the throat 29, it engages and actuates the feelers 112 downwardly and consequently actuates the switch 116 through the switch bar 113 to energize the lamps 24 to illuminate the copy and to engage the clutch 136 to drive the exposure drum 115 and take up reel 47 of the camera and thus feed the sensitized film 49 in the camera in synchronism with the feed of the copy by the feed rollers 75, 76, 88 and 89 to photograph the copy on the film, and so that as the sheet of copy disengages from the feelers 112 and they return to normal position, the switch is actuated through the switch bar 113 to deenergize the lamps 24 and to disengage the clutch 136.

The projector 9 is shown in Figures 9, 10 and 11 as having a lamp house 236 mounted on the inside of the wall 143 in alignment with and sealed to an apertured portion 244 thereof and extending inwardly from said wall. The lamp house 236 is of the ventilated type and has a generally vertically extending stack 237 inclined to diverge from the wall 143 from its lower to its upper end and having an incandenscent projection lamp 239 carried therein, in a socket 240 supported beneath the bottom of the stack 237 on support arms 241 extending therefrom. A forwardly directed concave reflector 242 is disposed to the rear of the projection lamp 239 (see Figure 11) within the lamp house 236 for projecting light forwardly therefrom through a condenser lens 243, facing the apertured portion 244 in the wall 143, for projecting a light beam therethrough onto a diagonal reflector 245, carried in a bracket 246 on the outside of the wall 143 and on the opposite side of the projection film gate 213 from the reflector 220 and converging lens 221.

When the turret 223 is angularly positioned oppositely from the position shown in full lines in Figures 9 and 10, the reflector 220 and lens 221 are directed toward the projection film gate 213 of the projector, as shown in dot and dash lines in Figure 9, and in this position, an image on the film 45 at the projection film gate 213, which is illuminated by the lamp 239 in cooperation with the reflector 242, the condenser 243 and the reflector 245, is projected onto the viewing screen 19 by reflection from the reflector 220 to the reflector 224 and reflection from the reflector 224 onto the viewing screen for the viewing of the image.

Noting that the exposure station (exposure aperture 219) of the camera and the projection station (projection apertured film gate 213) of the projector are arranged in spaced opposite relation with and directed toward the axis of the turret 223, the two reflectors 101 and 224, which are individual to the copying and viewing means, are spaced longitudinally of the turret axis in the same directed from and directed toward said stations and are displaced from each other perpendicularly to a plane of the turret axis normal to the exposure and projection stations, and of which the copying means reflector 101 substantially intersects the turret axis and the viewing means reflector 224 is radially displaced from the turret axis.

The common reflector 220 is decentered from the turret axis, as shown in Figure 10, perpendicularly to the plane of the angle of inclination of this reflector to the turret axis for alternate cooperation of this reflector with the reflectors 101 and 224 in the opposite positions of the common reflector. The projector 9 is arranged to project light to the common reflector 220 at an angle to the plane of the turret axis normal to the exposure and projection stations of the camera and projector, corresponding with the displacement of the viewing means reflector 224 from the turret axis for the reflection of the light from the projection station by the common reflector 220 to the reflector 224 and thence to the viewing screen 19. A light shield 247 is mounted on the turret 223 for rotation therewith and with the reflector 220 and lens 221 and extends from this reflector toward the reflectors 101 and 224 in a plane parallel to the plane of the angle of inclination of the reflector 220 to the turret axis and at the side of this reflector nearest the turret axis to prevent light from the viewing screen 19 entering the camera by reflection from the reflector 224 and thus interfering with the copying operation, it being noted that the light shield lies above the reflector 220 when it and the lens 221 are positioned for copying as shown in Figures 7 and 10. In viewing the light shield 247 lies below the projection light beam and does not function.

Another reflector 248, see Figures 7 and 8, is arranged within the hood 17 intermediate the viewing screen 19 and reflector 224, and is mounted on a horizontal shaft 249 arranged in parallelism with the reflector 224 and viewing screen 19 and which is pivotally mounted in bearings 250 and 251 on opposite walls of the hood.

As so pivotally mounted, the reflector 248 may be positioned in an upper non-functioning position, as shown in full lines in Figure 7, in which it is disposed out of the light path between the reflector 224 and viewing screen 19, or in a lower functioning position, as shown in dot and dash lines in Figure 7, in which it intercepts light between the reflector 224 and viewing screen 19 and is directed rearwardly toward the reflector 224 and downwardly toward the easel 70, and assuming the turret 223 and with it the reflector 220 and lens 221 to be positioning in cooperating relation with the projector 9, reflects an enlarged image projected from the film 45 at the projection film gate 213 onto a sensitized sheet (not shown) on the easel 70, for the printing of the image on the sheet.

As shown, spaced stops 253 fixed on opposite walls of the hood, limit downward movement of the reflector 248 and position the same for printing, and suitable means, unnecessary to be described, is provided for releasably positioning the reflector 248, in its upper non-functioning position. The shaft 249 projects outwardly through the hood 17 at one side thereof, see Figures 3 and 8, and a hand lever 255 is secured on the projecting end of the shaft for positioning the reflector in either of the aforesaid positions thereof, it being observed that this reflector must be in its upper position when it is desired to view images on the viewing screen 19.

As the film 49 is fed in the camera in the course of recording material thereon, the amount of film fed is recorded on the indexing counter 65 of the recording means, by reason of this counter being driven with the camera film feeding mechanism, so that an index of the material recorded on the film may be prepared during the recording operation on which the location of the different material recorded on the film may be indicated by reference to the corresponding numbers indicated by the counter, it being preferably that the counter be set at zero when each roll of the film is placed in the camera preparatory to recording thereon.

Having prepared such an index in the course of recording on the film in the camera, and having developed the film, the film is placed in the projector 9 for viewing, and preparatory to viewing, the indexing counter 66 of the viewing means which corresponds with the indexing counter 65 and is driven with the film feeding means of the viewing means, is set at the same indication, say zero, as the indexing counter 65 of the recording means was set before recording on the film. The indexing counters are driven at the same rate with reference to the feed of the film in the camera and projector, so that the user by referring to the previously prepared index and the indexing counter 66 of the viewing means can quickly and conveniently locate the desired material on the film for viewing the same, it being observed the indexing counters are conveniently located for observance and setting.

It may be seen from the foregoing that a simple, novel and efficient photographic copying and reading apparatus has been provided for copying documents, records, drawings and the like and for reading recorded records from a record bearing strip, and that the optical means, which is common to the copying and viewing means for copying and reading, is selectively operable to alternately cooperate with either the projector or camera by the simple turning of the turret 223 of the common optical means, by operation of the positioning hand knob 51.

It may further be seen that the optical means is so arranged as to project a beam of light over the long diagonal reflector 101 for copying when the optical means is in its copying position and that the converging lens in association with the reflector is selectively positionable in direct alignment with the film gate of the projector and with the exposure aperture of the camera.

It may still further be seen that we have provided a compact copying and reading apparatus all contained within a single casing, having a flat table top on one side thereof for copy and provided with a copy feed throat opening downwardly from the table top, having a viewing screen on the opposite side of the casing located in a convenient position for viewing, having the copy feed and illuminating mechanism beneath the table top and the projector and the camera located beneath the viewing screen with the common optical means therebetween, and having a convenient and desirable indexing arrangement.

It will be understood that modifications and variations of the present invention may be effected without departing from the spirit and scope of the novel concepts thereof.

We claim as our invention:

1. In a combined copying and viewing apparatus, the combination of photographic copying means for progressively photographing records on a sensitized strip, viewing means for progressively viewing records on a record bearing strip, and said copying and viewing means being provided respectively with an exposure station and a projection station arranged in spaced opposite relation with and directed toward an axis and comprising two reflectors individual thereto and spaced longitudinally of said axis in the same direction from and directed toward said stations and displaced from each other perpendicularly to a plane of said axis normal to said stations, a reflector common to said copying and viewing means and arranged between said stations and inclined to said axis and directed toward said individual reflectors and adapted to alternately cooperate with said individual reflectors and stations in opposite positions thereof angularly about said axis, a mounting mounted for pivotal movement on said axis and carrying said common reflector for the selective positioning thereof in either of said positions, said common reflector being decentered from said axis perpendicularly to the plane of the angle of inclination of said common reflector to said axis for alternate cooperation of said common reflector with said individual reflectors in said different positions of said common reflector, and a light shield carried by said mounting and extending from said common reflector toward said individual reflectors in a plane parallel to said plane of said angle of inclination and at the side of said common reflector nearest to said axis.

2. In a combined copying and viewing apparatus, the combination of photographic copying means for progressively photographing records on a sensitized strip, viewing means for progressively viewing records on a record bearing strip, and said copying and viewing means being provided respectively with an exposure station and a projection station arranged in spaced opposite relation with and directed toward an axis and comprising two reflectors individual thereto and spaced longitudinally of said axis in the same direction from and directed toward said stations and displaced from each other perpendicularly to a plane of said axis normal to said stations, a reflector common to said copying and viewing means and arranged between said stations and inclined to said axis and directed toward said individual reflectors and adapted to alternately cooperate with said individual reflectors and stations in opposite positions thereof angularly about said axis, a mounting mounted for pivotal movement on said axis and carrying said common reflector for the selective positioning thereof in either of said positions, said common reflector being decentered from said axis perpendicularly to the plane of the angle of inclination of said common reflector to said axis for alternate cooperation of said common reflector with said individual reflectors in said different positions of said common reflector, and a converging lens common to said copying and viewing means and mounted on said mounting in radial relation with said axis and cooperating relation with said common reflector and adapted to alternately cooperate with said stations.

3. In a combined copying and viewing apparatus, the combination of photographic copying means for progressively photographing records on a sensitized strip, viewing means for progressively viewing records on a record bearing strip, said copying and viewing means being provided respectively with an exposure station and a projection station arranged in spaced opposite relation with and directed toward an axis and having two reflectors individual thereto and spaced longitudinally of said axis in the same direction from and directed toward said stations and displaced from each other perpendicularly to a plane of said axis normal to said stations and of which the copying means reflector is inclined to said axis in said plane and of which the viewing means reflector is inclined to said axis in a plane of said axis normal to said first mentioned plane, a reflector common to said copying and viewing means and arranged between said stations and inclined to said axis and directed toward said individual reflectors and adapted to alternately cooperate with said individual reflectors and stations in opposite positions thereof angularly about said axis, a mounting mounted for pivotal movement on said axis and carrying said common reflector for the selective positioning thereof in either of said positions, said copying means reflector substantially intersecting said axis and said viewing means reflector being radially displaced from said axis, and said common reflector being decentered from said axis perpendicularly to the plane of the angle of inclination of said common reflector to said axis for alternate cooperation of said common reflector with said individual reflectors in said different positions of said common reflector.

4. In a combined copying and viewing apparatus, the combination of photographic copying means for progressively photographing records on a sensitized strip, viewing means for progressively viewing records on a record bearing strip, said copying and viewing means being provided respectively with an exposure station and a projection station arranged in spaced opposite relation with and directed toward an axis and having two reflectors individual thereto and spaced longitudinally of said axis in the same direction from and directed toward said stations and displaced from each other perpendicularly to a plane of said axis normal to said stations and of which the copying means reflector is inclined to said axis in said plane and of which the viewing means reflector is inclined to said axis in a plane of said axis normal to said first mentioned plane, a reflector common to said copying and viewing means and arranged between said stations and inclined to said axis and directed toward said individual reflectors and adapted to alternately cooperate with said individual reflectors and stations in opposite positions thereof angularly about said axis, a mounting mounted for pivotal movement on said axis and carrying said common reflector for the selective positioning thereof in either of said positions, said copying means reflector substantially intersecting said axis and said viewing means reflector being radially displaced from said axis, said common reflector being decentered from said axis perpendicularly to the plane of the angle of inclination of said common reflector to said axis for alternate cooperation of said common reflector with said individual reflectors in said different positions of said common reflector, and a projector arranged to project light through said projection station to said common reflector at an angle to said first mentioned plane corresponding with the displacement of said viewing means reflector from said axis.

5. In a combined copying and viewing apparatus, the combination of photographic copying means for progressively photographing records on a sensitized strip, viewing means for progressively viewing records on a record bearing strip, said copying and viewing means being provided respectively with an exposure station and a projection station arranged in spaced opposite relation with and directed toward an axis and having two reflectors individual thereto and spaced longitudinally of said axis in the same direction from and directed toward said stations and displaced from each other perpendicularly to a plane of said axis normal to said stations and of which the copying means reflector is inclined to said axis in said plane and of which the viewing means reflector is inclined to said axis in a plane of said axis normal to said first mentioned plane, a reflector common to said copying and viewing means and arranged between said stations and inclined to said axis and directed toward said individual reflectors and adapted to alternately cooperate with said individual reflectors and stations in opposite positions thereof angularly about said axis, a mounting mounted for pivotal movement on said axis and carrying said common reflector for the selective positioning thereof in either of said positions, said copying means reflector substantially intersecting said axis and said viewing means reflector being radially displaced from said axis, said common reflector being decentered from said axis perpendicularly to the plane of the angle of inclination of said common reflector to said axis for alternate cooperation of said common reflector with said individual reflectors in said different positions of said common reflector, a projector arranged to project light through said projection station to said common reflector at an angle to said first mentioned plane corresponding with the displacement of said viewing means reflector from said axis, a converging lens common to said copying and viewing means and mounted on said mounting in radial relation with said axis and cooperating relation with said common reflector and adapted to alternately cooperate with said stations, and a light shield carried by said mounting and extending from said common reflector toward said individual reflectors in a plane parallel to said plane of said angle of inclination and at the side of said common reflector nearest said axis.

6. In a combined copying and viewing apparatus, the combination of a casing, one part of which has a viewing screen and hood therefor projecting from the top thereof and the other part of which has a relatively flat top with a feed throat for copy leading therethrough within said casing, copy feeding and reflecting means beneath said flat top within said casing for reflecting images from copy to said one part of said casing, an exposure station and a projection station arranged in said one part of said casing beneath said viewing screen in spaced opposite relation with and directed toward an axis, two reflectors within said one part of said casing and spaced along said axis from and directed toward said exposure and projection stations and respectively directed toward said first mentioned reflecting means and viewing screen, optical means comprising a reflector common to said stations and said two reflectors and arranged within said one casing part between said stations and inclined to said axis, a mounting mounted for pivotal movement about said axis and carrying said common reflector for alternately positioning the same in cooperative relation with said stations and said two reflectors, said common reflector being decentered from said axis perpendicularly to the plane of the angle of inclination of said common reflector to said axis for alternate cooperation of said common reflector with said two reflectors in said different positions of said common reflector, and a light shield carried by said mounting and extending from said common reflector toward said two reflectors in a plane parallel to said plane of said angle of inclination and at the side of said common reflector corresponding to said plane of said angle of inclination nearest to said axis.

References Cited in the file of this patent

UNITED STATES PATENTS

| | | |
|---|---|---|
| 2,180,007 | Hopkins | Nov. 14, 1939 |
| 2,564,440 | Maser | Aug. 14, 1951 |